United States Patent [19]

Sone et al.

[11] Patent Number: 4,771,268
[45] Date of Patent: Sep. 13, 1988

[54] CHARACTER RECOGNITION DEVICE

[75] Inventors: Hironao Sone; Hiroyuki Suetaka, both of Tokyo, Japan

[73] Assignee: Casio Computer Co., Ltd., Tokyo, Japan

[21] Appl. No.: 132,623

[22] Filed: Dec. 4, 1987

Related U.S. Application Data

[60] Continuation of Ser. No. 930,040, Nov. 10, 1986, abandoned, which is a division of Ser. No. 561,184, Dec. 14, 1983, abandoned.

[30] Foreign Application Priority Data

Dec. 27, 1982 [JP] Japan ................................ 57-232559

[51] Int. Cl.$^4$ ................................................ G06F 3/02
[52] U.S. Cl. ............................ 340/365 C; 340/365 R; 382/10
[58] Field of Search ............ 340/365 C, 365 R, 365 S, 340/711, 712, 693, 688; 382/3, 10, 13, 21, 59

[56] References Cited

U.S. PATENT DOCUMENTS

| | | | |
|---|---|---|---|
| 3,657,475 | 4/1972 | Peronneau et al. | |
| 3,996,557 | 12/1976 | Donahey | 382/13 |
| 4,024,500 | 5/1977 | Herbst et al. | 382/13 |
| 4,047,010 | 9/1977 | Perotto et al. | 382/13 |
| 4,139,837 | 2/1979 | Liljenwall et al. | 382/13 |
| 4,199,751 | 4/1980 | Piguet | |
| 4,232,290 | 11/1980 | Yasuda et al. | 382/13 |
| 4,242,676 | 12/1980 | Piguet et al. | 340/365 C |
| 4,318,181 | 3/1982 | Kawakami et al. | |
| 4,542,526 | 9/1985 | Satoh et al. | 382/13 |

FOREIGN PATENT DOCUMENTS

| | | |
|---|---|---|
| 0098223 | 1/1984 | European Pat. Off. .............. 382/13 |
| 2538658 | 4/1976 | Fed. Rep. of Germany . |
| 2824913 | 12/1978 | Fed. Rep. of Germany . |
| 3004461 | 8/1981 | Fed. Rep. of Germany . |
| 2447581 | 8/1980 | France . |
| 0121484 | 7/1984 | Japan . |
| 2029619 | 5/1979 | United Kingdom . |
| 2092352 | 12/1981 | United Kingdom . |
| 2092352A | 8/1982 | United Kingdom . |

OTHER PUBLICATIONS

H. S. Hoffman, Jr.–"Exact Position Detection with Figner Point and Feedback"–IBM Technical Disclosure Bulletin–vol. 23, No. 6, Nov. 1980–p. 2341.

Mesures Regulation Automation, vol. 42, No. 9, Sep. 1977, pp. 69–73, C. Pignet et al.: "Entree de donness Pour Motre Multifonctionnelle", p. 71, chapter 4, p. 72, Colonne de gauche, chapter 5, Zeme alinea.

Primary Examiner—Marshall M. Curtis
Assistant Examiner—Mahmoud Fatahiyar
Attorney, Agent, or Firm—Frishauf, Holtz, Goodman & Woodward

[57] ABSTRACT

A character recognition device has an input section having a plurality of touch electrodes. When the human body contacts at least two of the touch electrodes of the plurality of touch electrodes, the contacting capacity components of the touch electrodes are detected by a capacity component detection section. The contacting central point coordinates of the touch electrodes are calculated by calculation sections from the contacting capacity components of the touch electrode thus detected. The character hand-written on the plurality of touch electrodes is recognized as a character by character recognition sections, from the contacting central point coordinates calculated by the calculating sections.

6 Claims, 17 Drawing Sheets

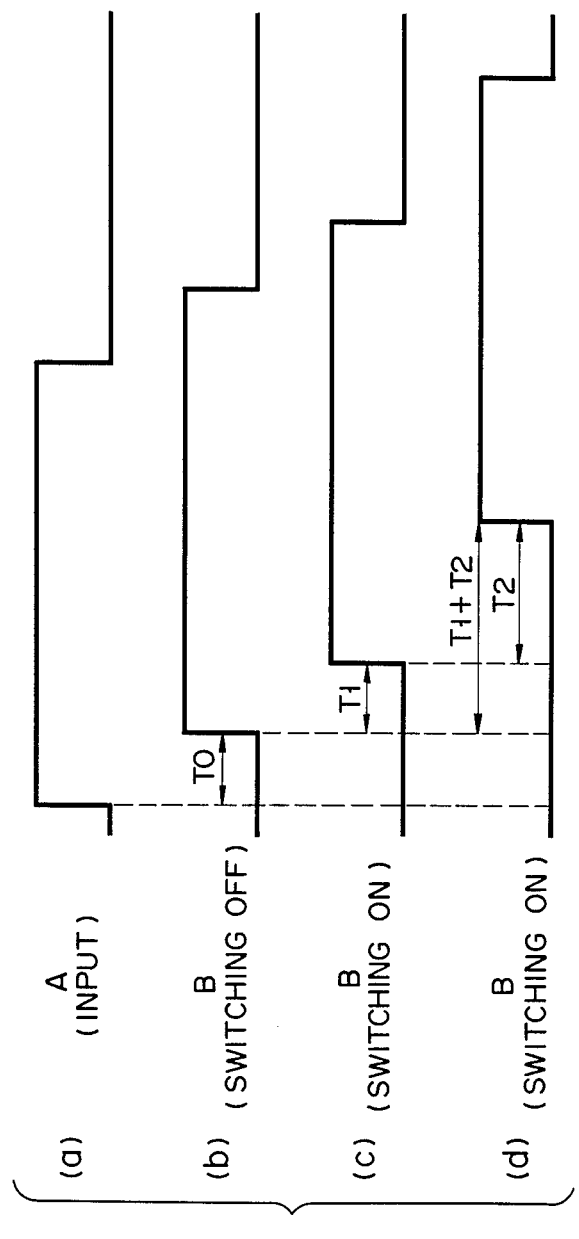

FIG. 9

| T | | | 13 |
|---|---|---|---|
| AL | | | |
| TM | | | |
| M | m | $\ell$ | |
| n | $F_A$ | $F_1$ | $F_2$ |
| $Y_{80} \sim Y_{8F}$ | | | |
| $T_{80} \sim T_{8F}$ | | | |
| A | C | D | E |
| $x_m$ | $y_m$ | Z | S |
| $x_s$ | $y_s$ | $X_m$ | $Y_m$ |

FIG. 10

| | M1 | | M2 | | M3 | | M4 | 13 |
|---|---|---|---|---|---|---|---|---|
| | X | Y | X | Y | X | Y | X | Y |
| 0 | | | | | | | | |
| 1 | | | | | | | | |
| 2 | | | | | | | | |
| 3 | | | | | | | | |
| 4 | | | | | | | | |
| 5 | | | | | | | | |
| ⋮ | | | | | | | | |
| 19 | | | | | | | | |

F I G. 15
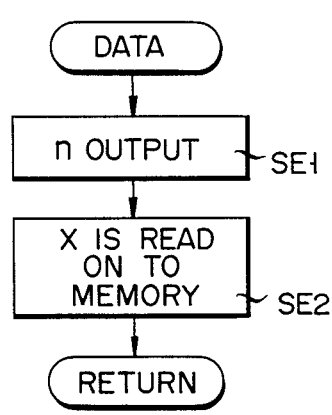
F I G. 14
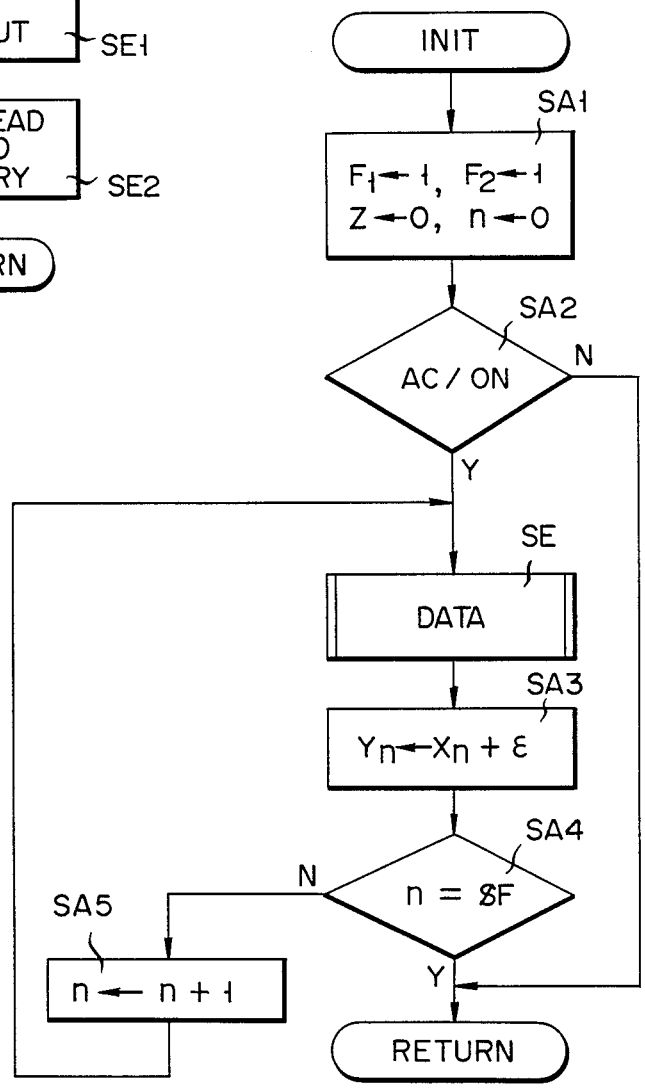

FIG. 20

STROKE 1

| | | | | | | |
|---|---|---|---|---|---|---|
| 0 | 4 | 6 | 7 | 0 | 1 | 2 |
| 0 | 3 | 2 | 0 | 7 | 6 | 4 |
| 1 | 6 | 6 | 6 | 6 | 6 | 6 |
| 2 | 1 | 7 | 5 | 5 | 0 | 0 |
| 3 | 0 | 7 | 5 | 0 | 6 | 4 |
| 6 | 5 | 5 | 7 | 1 | 3 | 4 |
| 7 | 0 | 0 | 6 | 5 | 5 | 5 |
| 8 | 4 | 7 | 6 | 3 | 1 | 1 |
| 8 | 3 | 0 | 6 | 5 | 0 | 3 |
| 9 | 3 | 5 | 0 | 1 | 6 | 5 |
| 9 | 3 | 1 | 0 | 6 | 5 | 5 |
| C | 3 | 4 | 5 | 6 | 0 | 1 |
| J | 6 | 6 | 6 | 5 | 4 | 3 |

STROKE 2

| | | | | | | | | | | | | |
|---|---|---|---|---|---|---|---|---|---|---|---|---|
| 4 | 5 | 5 | 5 | 0 | 0 | 0 | 6 | 6 | 6 | 6 | 6 | 6 |
| 5 | 6 | 6 | 7 | 6 | 4 | 4 | 0 | 0 | 0 | 0 | 0 | 0 |
| 7 | 0 | 0 | 6 | 6 | 6 | 6 | 6 | 6 | 6 | 6 | 6 | 6 |
| 7 | 6 | 6 | 6 | 6 | 6 | 6 | 0 | 0 | 6 | 6 | 6 | 6 |
| A | 2 | 2 | 1 | 7 | 6 | 6 | 0 | 0 | 0 | 0 | 0 | 0 |
| B | 6 | 6 | 6 | 6 | 6 | 6 | 0 | 6 | 5 | 0 | 7 | 4 |
| D | 6 | 6 | 6 | 6 | 6 | 6 | 0 | 7 | 7 | 6 | 5 | 4 |
| G | 4 | 5 | 6 | 7 | 0 | 6 | 0 | 0 | 0 | 0 | 0 | 0 |
| G | 3 | 4 | 5 | 6 | 0 | 1 | 6 | 0 | 6 | 6 | 6 | 6 |

⋮

| P | 6 | 6 | 6 | 6 | 6 | 6 | 6 | 7 | 7 | 6 | 5 | 4 |

⋮

| T | 0 | 0 | 0 | 0 | 0 | 0 | 6 | 6 | 6 | 6 | 6 | 6 |

⋮

| | 0 | 0 | 0 | 0 | 0 | 0 | 6 | 6 | 6 | 6 | 6 | 6 |

STROKE 3

STROKE 4

| P | D |
|---|---|
| 1 | F |
| 2 | Z |
| 6 | O |
| U | V |
| T | + |
| ⋮ | ⋮ |

CHARACTER RECOGNITION DEVICE

This application is a continuation application under 37 CFR 1.162 of prior application Ser. No. 930,040 filed Nov. 10, 1986, now abandoned, which in turn is a divisional application of Ser. No. 561,184 filed Dec. 14, 1983 (now abandoned).

BACKGROUND OF THE INVENTION

The present invention relates to a character recognition technique adapted for a small-sized electronic apparatus.

A character recognition device is known which is adapted to trace the shape of a charater, by a finger or a pen-type jig, on input electrodes in a matrix array, detect coordinate positions of the input electrode which the finger or the jig contacts, and recognize the character based on the detected coordinate positions. Such character recognition device is disclosed, for example, in GB No. 2029619A and GB No. 2092352A. In order to recognize the features of a hand-written character pattern more accurately, a greater number of input electrodes must be provided in close proximity to one another with one input electrode corresponding to one coordinate position, making it impossible to obtain a compact electronic unit.

In particular, when a character pattern is intended to be recognized with less number of input electrodes as disclosed in GB No. 2092352A, a method of tracing a character is limited in such a manner that, when the character writing position is displaced or superposed, the character is feasibly recognized erroneously. Thus, each character should be precisely traced, by an operator.

SUMMARY OF THE INVENTION

It is an object of the present invention to provide a character recognition technique which can accurately recognize a character pattern with less number of electrodes and provide a preferable operability.

According to the present invention, a method for recognizing a character finger-traced on a plurality of touch responsive electrodes, comprises detecting and storing contacted capacitance components of at least two of the touch responsive electrodes which have been simultaneously touched by a human's finger; calculating central contacting point data based on the stored capacitance components and storing the central contacting point data; repeating the contacted-capacitance component detecting step and the central contacting point data calculating and storing steps while the human's finger is tracing on the plurality of touch responsive electrodes, so as to obtain plural items of central contacting point data which are greater in number than those of the touch responsive electrodes which are finger-traced; and recognizing a finger-traced character based on the plural items of central contacting point data obtained in the central contacting point data obtaining and storing steps.

The character recognition technique according to the present invention respectively obtains the lengths of the strokes of character pattern data thus hand-written on the plurality of touch electrodes, then divides the strokes into a plurality of parts at an equal interval, discriminates the vectors of the divided parts to obtain a vector row and compares the vector row thus obtained with reference vector rows of the character patterns of a plurality of characters to discriminate the character having the most similar vector row. Therefore, the character recognition technique can accurately recognize the character. Thus, the present invention can provide a character recognition technique which utilizes simple hardware, can be readily uitlized for a small-sized electronic apparatus, can precisely recognize the character and can rapidly recognize the character at a fast processing speed.

BRIEF DESCRIPTION OF THE DRAWINGS

FIGS. 3(a) to 3(d) are timecharts of the waveforms of the output signals for comparing the case that a finger does not contact the touch electrode, with the case that the finger contacts the touch electrode;

FIGS. 9 and 10 are views showing the memory cells in an RAM 13 shown in FIG. 7;

FIG. 14 is a flowchart showing the concrete content of the initializing step in FIG. 13(a);

FIG. 15 is a flowchart showing the concrete content of the data inputting step in FIG. 14;

FIGS. 20, 21, 22 and 23 are views showing reference vector rows of the character patterns of the stroke numbers "1", "2", "3" and "4"; and FIG. 24 is a view showing an example of similar character patterns.

DETAILED DESCRIPTION OF THE PREFERRED EMBODIMENTS

An embodiment of the present invention will now be described in more detail with reference to the accompanying drawings.

Figure 1:
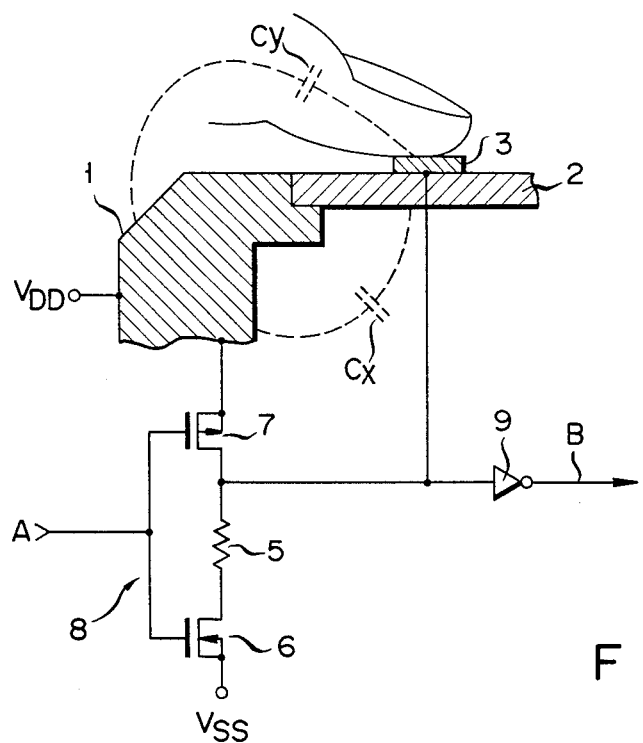
FIG. 1 is a partial structural view for describing the fundamental principle of the present invention.
Figure 2A:
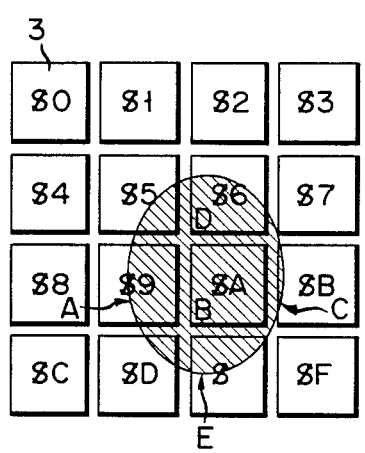
FIG. 2(a) is a view showing the contacting state of a finger with the touch electrode of the invention.

FIG. 1 shows a case 1 of an electronic apparatus such as a miniature computer, an electronic timepiece, a watch or a clock. A transparent surface glass 2 is fixed to the case 1. Transparent touch electrodes 3 of a total of 16 in a matrix of 4×4 are disposed at a predetermined interval on the upper surface of the surface glass 2 as shown in FIG. 2(a). Symbols $0 to $F of a hexadecimal notation are designated on the sixteen touch electrodes as shown in FIG. 2(a) for the convenience of description. The case 1 is formed of metal, connected to the logic value "1" side of a high voltage $V_{DD}$ of a power source, and used also as one touch electrode. Thus, when a human body further contacts the touch electrode 3 in the state that the human body contacts the case 1, the touch electrode 3 can be turned ON. In FIG. 1, a symbol Cx indicates a floating capacity component, which is effected by an electrode wiring capacity produced by the wirings of the touch electrodes 3 and a gate capacity a tern reflecting the input impedance of a gate of a C-MOSIC employed in this embodiment. A symbol Cy indicates the human contacting capacity component which is produced between the watch case 1 and the touch electrode 3 when the touch electrode 3 is contacted. Therefore, the floating capacity component Cx always exists, while the contacting capacity component Cy is artificially produced.

In FIG. 1, symbol A designates a rectangular signal of a predetermined period (e.g., 64 Hz). The signal A is inputted to the gates of C-MOS inverters 8 which comprise a resistor 5 and an N-channel MOS transistor 6 and a P-channel MOS transistor 7. A low voltage $V_{SS}$ (logic value "0")of a power source is supplied to the source side of the transistor 6, and a high voltage $V_{DD}$ is supplied through the case 1 to the source side of the transistor 7. The output signal of the inverter 8 is inputted to the touch electrode 3 and outputted as a signal B through a C-MOS inverter 9. In other words, the signal B is a decision signal which identifies whether the human body contacts the touch electrode 3 or not, i.e., the presence or absence of the touch of the electrode 3.

When the signal A becomes, as shown in FIG. 3(a), a high voltage level which is inputted to the inverter 8 in the state the touch electrode 3 is not contacted with the human body, the output signal of the inverter 8 becomes a low voltage level. Thus, the output signal of the inverter 9 becomes a high voltage level. Since the output signal of the inverter 8 is affected by the influence of the flowing capacity component Cx at this time, the output signal of the inverter 9 is delayed, as shown in FIG. 3(b), at the rise by a time $T_0$ relative to the rectangular signal A.

When the human body then contacts the touch electrode 3, a contacting capacity component Cy is produced between the electrode 3 and the case 1, and becomes the state connected in parallel with the floating capacity component Cx. In this manner, the output signal B of the inverter 9 is outputted in delay corresponding to the synthetic capacity of the floating capacity component Cx and the contacting capacity component Cy relative to the rectangular signal A.

The magnitude of the contacting capacity component Cy depends upon the contacting area of the human body with the touch electrode 3 or the contacting state such as a pressing force, and is proportional to the contacting area. Further, the rise time of the output signal B of the inverter 9 when the contacting capacity component Cy is small is outputted in delay, as shown in FIG. 3(c), corresponding to a time $T_1$ as compared with the output signal of the case that the human body is not contacted with the electrode 3 as shown in FIG. 3(b). On the other hand, the rise time of the output signal B of the inverter 9 when the contacting capacity component Cy is large is outputted, as shown in FIG. 3(d), is delayed corresponding to the time $(T_1+T_2)$. In this manner, the magnitude of the contacting capacity component Cy which is outputted as a value substantially proportional to the contacting area, can be identified in response to the state of the output signal B of the inverter 9.

Figure 4:
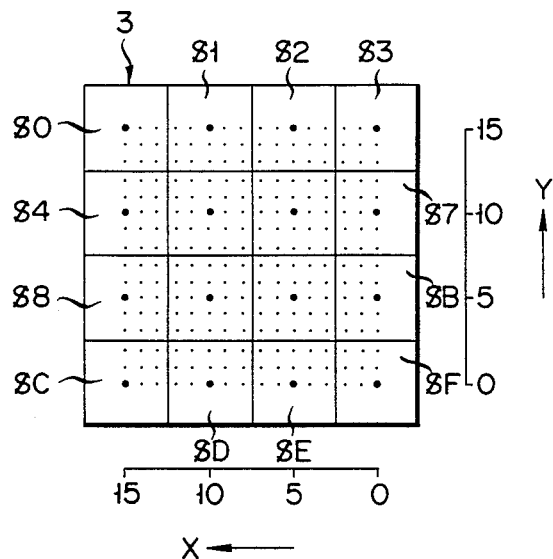
FIG. 4 is a structural view showing sixteen touch electrodes of the invention in an X-Y coordinate system.

FIG. 4 shows an X-Y coordinate system set in the touch electrodes 3 arranged in a matrix of 4×4. In the X-Y coordinate system as shown, the coordinate positions of 16×16=256 points are set by connecting the central positions of 12 touch electrodes 3 disposed on the outer periphery (symbols $0, $1, $2, $3, $4, $7, $8, $B, $C, $D, $E, $F) in the coordinate surface. The X-Y coordinate positions are represented by points (0, 0) to (15, 15).

Figure 2B:
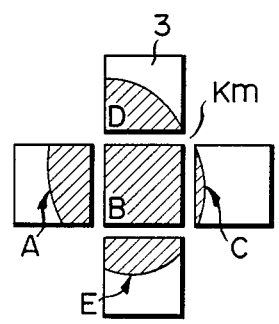
FIG. 2(b) is a view showing the contacting state of the finger with four touch electrodes adjacent to the touch electrodes having the maximum contacting capacity components shown in FIG. 2(a)
Figure 5:
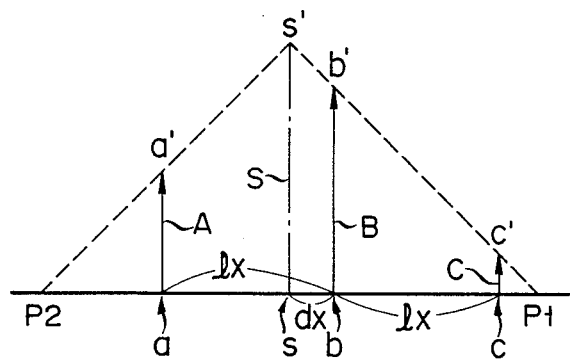
FIG. 5 is a view for describing the arithmetic algorithm for obtaining the central coordiantes of the touch electrode when the finger contacts the touch electrode of the invention.

Referring now to FIGS. 2(a), 2(b) and 5, a principle of inputting the 256 coordinate positions on the X-Y coordinate system formed as shown in FIG. 4 will be described. In case of the present invention as described above, the rise time of the signal B shown in FIG. 1 is delayed proportionally to the contacting capacity component Cy and hence the contacting area. Therefore, the delay amount of the signal B is detected by a counter to be described later and the detected value is calculated, thereby obtaining the central coordinate position of the area contacted with the human body. FIG. 2(a) shows the state that the human finger simultaneously contacts a plurality of touch electrodes 3 designated by symbols A, B, C, D and E. The counter executes counting the electrodes 3 and resultantly detects the counted value proportional to the contacting area of the electrodes 3. A control unit to be described later first obtains the electrode 3 having the maximum value of the counted values from among the counted values (the electrode 3 designated by the symbol B in the embodiment shown), then selects electrodes at the upper, lower, rightside and leftside of the electrode 3 having the maximum value of the counted values (the electrodes 3 designated by the symbols D, E, A and C as shown in FIG. 2(b)), and computes the direction and the amount of the displacement of the central coordinate position of the present contacting areas designated by the shaded areas from the central coordinate position of the electrode 3 having the maximum counted value (the electrode designated by the symbol B) from among the counted values, thereby obtaining the coordinates of the central position of the present contacting area. In this case, when the following assumptions are set, (I) The number of the electrode 3 having the maximum counted value is designated by Km, (II) The counted value for electrode Km is designated by B, (III) The counted value for the upper electrode 3 relative to Km is designated by D, (IV) The counted value for the lower electrode 3 relative of Km is designated by E, (V) The counted value for the leftside electrode 3 relative of Km is designated by A, and (VI) The counted value for the right-side electrode 3 relative of Km is designated by C, the coordinates of the central position can be obtained from the five counted values in the above paragraphs (II) to (VI) by computations calculated for the X-axis and Y-axis. In other words, FIG. 5 shows the algorithm of the computations, wherein the abscissa axis indicates the central position of the electrode 3 (i.e., points a, b and c respectively depict the central positions of the electrodes 3 designated by the symbols A, B and C) and the ordinate axis indicates the counted values. In FIG. 5, the point S indicates the central position of the present contacting area with the counted value S, and the coordinate position s is obtained by the congruence of isosceles triangles.

In FIG. 5, the intersection point of straight lines bc and b'c' is designated by $P_1$ and a point $P_2$ of a formula $<c'P_1c = <a'P_2a$ is plotted at the left side of the point a on the straight line ab.

Further, the intersection point of the straight lines $P_2a'$ and b'c' is desingated by S', and the intersection point of the straight line ab and a vertical line drawn from the point S' is designated by s. The following formula (1) is obtained from the relation of the formula $$\Delta SS'P_1 \equiv \Delta SS'P_2$$

with the result that the formula (2) is obtained.

$$\frac{B-C}{lx} = \frac{S-C}{lx+dx} = \frac{S-A}{lx-dx} \quad (1)$$

$$\therefore dx = \frac{lx}{2} \cdot \frac{A-C}{B-C} \quad (2)$$

where the pitch of the electrodes 3 (e.g., the distance between the points a and b) is designated by lx, and the distance between the points S and b is designated by dx.

With respect to y-axis, the following formula (3) can be obtained in the same manner as above.

$$dy = \frac{ly}{2} \cdot \frac{D-E}{B-E} \quad (3)$$

When the above formulae (2) and (3) are applied to the X-Y coordinates in FIG. 4, the following relation can be obtained. Since the X-Y coordinates contain the points (0, 0) to (15, 15), the following formula (4) can be obtained.

$$lx = ly = 5 \quad (4)$$

When the numbers of the sixteen electrodes 3 are indicated by (5x, 5y), the values of x and y are any of 0, 1, 2 and 3. Assuming that Km=(5xm, 5ym), the coordinate position (X, Y) becomes:

$$(X, Y) = \left(5xm + \frac{5}{2} \cdot \frac{A-C}{B-C}, 5ym + \frac{5}{2} \cdot \frac{D-E}{B-E}\right) \quad (5)$$

where Km indicates the electrode at the end, and when there is no adjacent electrode 3, i.e., xm=0, xm=3, ym=0 and ym=3, the counted values C, A, E and D are respectively set to "0".

Sixteen touch electrodes are provided as described above, but since the central coordinate position of the contacting area can be obtained by the computation from the formula (5) as known from the X-Y coordinate system shown in FIG. 5, contacting positions with the human body in the amount of $16 \times 16 = 256$ ways can be detected. Therefore, even if a complicated character input is applied to the character recognition device, the character input handwritten by way of the contacting positions can be accurately recognized.

The character recognition device of the invention applied to an electronic wrist watch will be described as an example with reference to FIG. 6 and following drawings.

The foregoing description relates to the application of the character recognition device of the invention to an electronic wrist watch. However, the present invention can also be in general applied to any electronic apparatus which requires an input of character and numeric characters or other electronic apparatus such as, for example, small-sized electronic calculators or microcomputers within the scope and spirit of the present invention.

Figure 6:
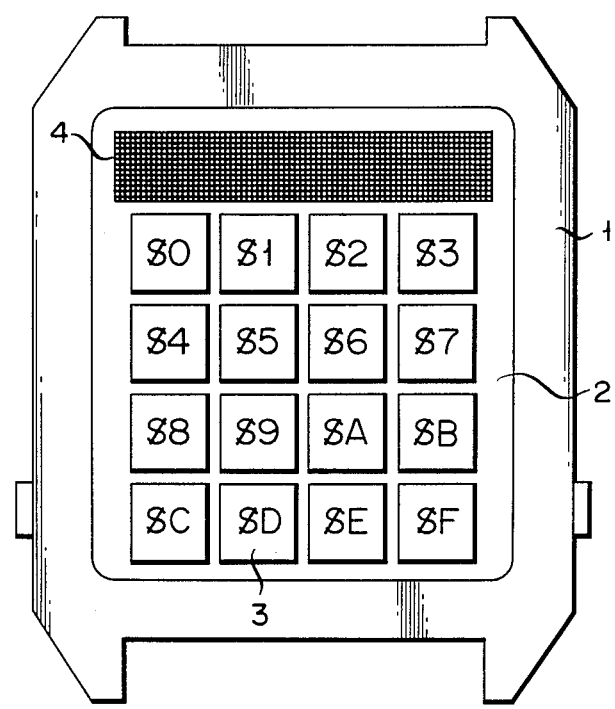
FIG. 6 is a view of the external appearance of an electronic wrist watch, to which the character recognition device of the invention is applied.

FIG. 6 is a front view of an electronic wrist watch, which comprises a case 1, a surface glass 2, touch electrodes 3, and a dot display unit 4 of a liquid crystal display unit. The display unit 4 displays a time, a handwritten input character or a numeric character.

Figure 7:
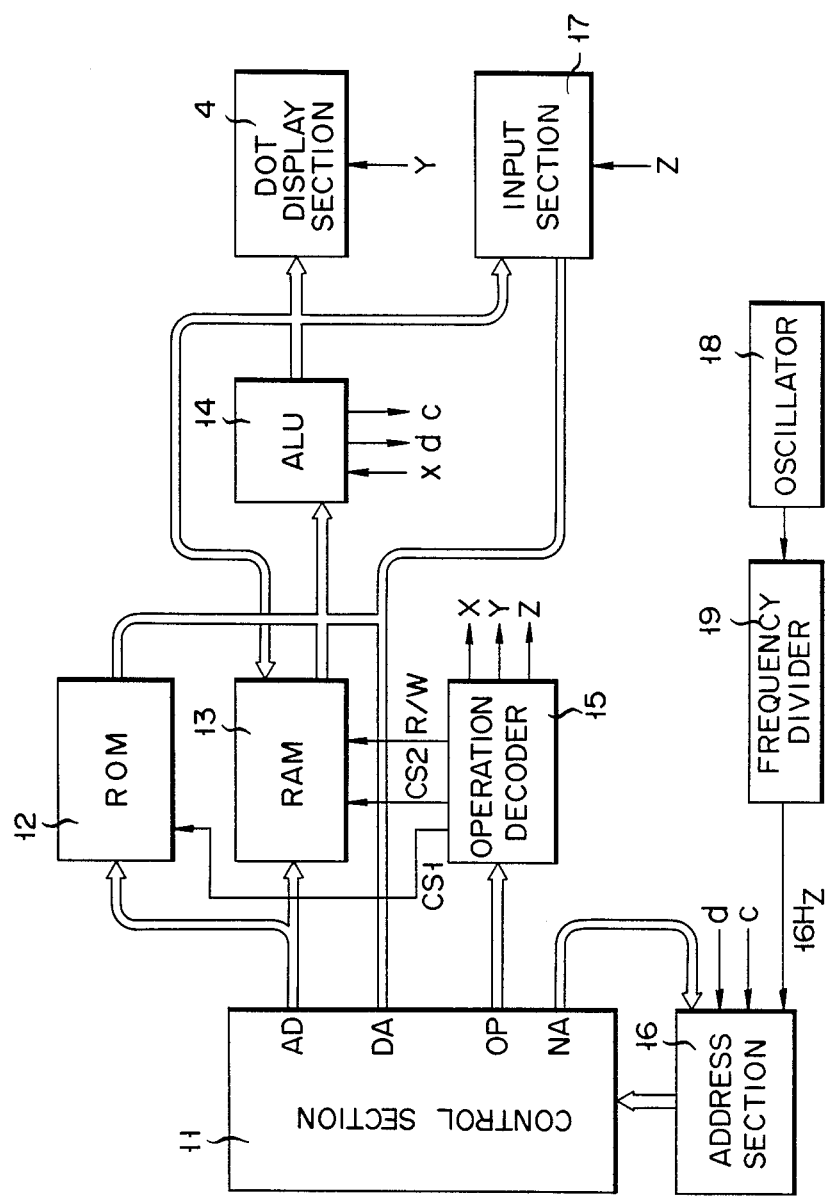
FIG. 7 is a block circuit diagram showing an embodiment of the present invention.
Figure 8:
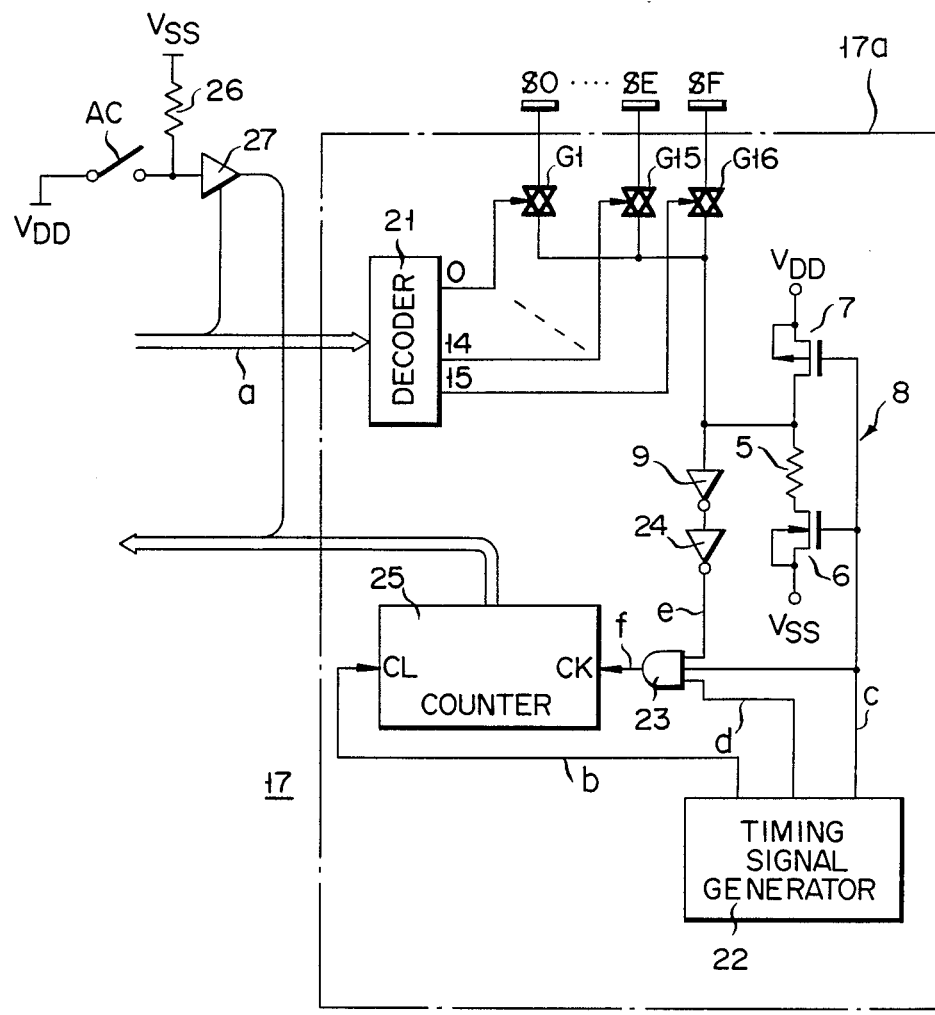
FIG. 8 is a circuit diagram showing an example of an input unit 17 shown in FIG. 7.

FIGS. 7 and 8 show block diagrams of the wrist watch. A control section or unit 11 shown in FIG. 7 stores all microprograms for controlling the operation of the wrist watch and outputs in parallel microinstructions AD, DA, OP and NA. The microinstruction AD is supplied as address data to an ROM (read-only memory) 12 and an RAM (random access memory) 13. The microinstruction DA is supplied as data to the RAM 13 or an ALU 14. Further, the microinstruction OP is applied to an operation decoder 15, with the result that the decoder 15 outputs various control signals $CS_1$, $CS_2$, R/W, X, Y and Z. The microinstruction NA is applied to an address section 16, which executes the following processing from the microinstruction NA and signals d, c of 16 Hz to be described later. The address section 16 further outputs address data for reading out the microinstructions AD, DA, OP and NA to the control unit 11.

The ROM 12 stores each character pattern (to be described later) of alphanumeric characters. When the control signal $CS_1$ is supplied to the ROM 12 from the operation decoder 15, data is read out from the ROM 12 and then supplied to the ALU 14.

The RAM 13 has, as shown in FIG. 9, various registers, which are utilized for various processings such as time counting, timer processing, and character recognition processing carried out by the ALU 14. A T register is utilized for storing a present time, an AL register is for storing an alarm time, a TM register is for storing a timer time, and the other registers will be described later. Further, the RAM 13 contains, as shown in FIG. 10, other areas such as areas $M_1$ to $M_4$ for storing the data of the coordinate position (X, Y) calculated by the calculation of the formula (5). More particularly, the areas $M_1$, $M_2$, $M_3$ and $M_4$ respectively store the coordinate position data (X, Y) of the first, second, third and fourth strokes of the character pattern data inputted from the touch electrodes 3 to a maximum of 20. The total lengths (stroke length) of the respective strokes are calculated from the data thus written in the areas $M_1$ to $M_4$ of the RAM 13 at the character recognition processing time in the ALU 14, each stroke length is then equally divided into six parts to obtain the vector row by judging the vector of each segment, the vector row is compared with the reference vector row of the respective character patterns in the ROM 12, and the character pattern of the most similar reference vector row is processed as the character pattern data. The RAM 13 executes reading/writing of the data with the control signals $CS_2$ and R/W.

Figure 19:
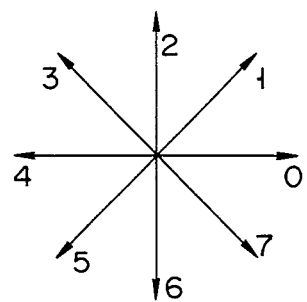
FIG. 19 is an explanatory view of the vector.
Figure 18A:
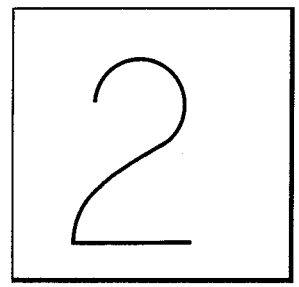
FIGS. 18(a) to 18(c) are views for describing the operation capable of obtaining a vector row for numeric character "2"
Figure 18B:
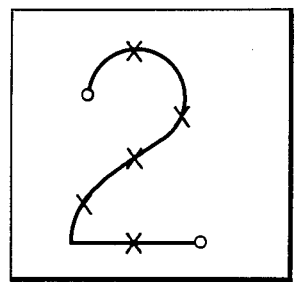
Figure 18C:
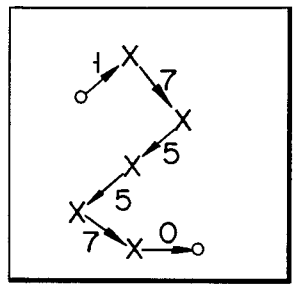

The above described strokes and vectors will be described in more detail. FIGS. 18(a) to 18(c) show the state of a numeric character "2" of the first stroke number inputted from the touch electrodes 3. When the character pattern data "2" is inputted, as shown in FIG. 18(a), the coordinate position data is written in the area $M_1$ of the RAM 13 as described above since this case corresponds to the first stroke. After the stroke length of the first stroke is calculated as shown in FIG. 18(b), the stroke is equally divided into six parts. Each equal segment is approximated to a straight line from the starting point side to the ending point side as shown in FIG. 18(c), the vector of each segment is judged in accordance with the vector (8 types of 0 to 7) in FIG. 19, and the vector row is calculated.

FIGS. 20, 21, 22 and 23 respectively show reference vector rows for the character patterns of the first, second, third and fourth strokes as stored in the ROM 12.

Returning to FIG. 7, the ALU 14 executes various computations described above under the control of the control signal X, with the result that the data are supplied to the RAM 13, a dot display section 4 and an input section 17. In case of carrying out the judge computation, the ALU 14 outputs a signal d which indicates the presence of data in the computing result and a signal c which indicates the production of a carry to the address section 16 to allow the address section 16 to output the next address.

The dot display section 4 indicates a message stored and set in advance for a predetermined time when becoming an alarm time under the control of a control signal Y. The input section 17 has the touch electrodes 3, and outputs as input data the counted value under the control of a control signal Z to the RAM 13 and the ALU 14 for processing.

An oscillator 18 always oscillates a reference frequency signal such as 32.768 kHz to a frequency divider 19, which outputs a signal of 16 Hz divided from the reference frequency signal to the address section 16. Thus, time counting flow is executed at every 1/16 sec. in response to the signal of 16 Hz.

The constitution of the input section 17 will be concretely described with reference to FIG. 8, which shows a capacity component detection section 17a. To a decoder 21 is applied data a of 4 bits outputted from the control unit 11 when executing the character recognition. The data a is the data supplied from the ALU 14 in FIG. 14 and allows the decoder 21 to sequentially assign the sixteen touch electrodes 3 represented by the symbols S0 to SF in a time division manner, and to sequentially output the signals B (Refer to FIG. 3) corresponding to the electrodes. In other words, the data a is decoded by the decoder 21, converted into signals "0" to "15" sequentially outputted as signals of high voltage $V_{DD}$ level and supplied to the gates of corresponding transmission gates $G_1$ to $G_{16}$. The input sides of the gates $G_1$ to $G_{16}$ are respectively connected to the output terminals of the corresponding touch electrodes S0 to SF, and the output sides of the gates $G_1$ to $G_{16}$ are respectively connected to the inverters 8 and 9 described with respect to FIG. 1. A rectangular signal c outputted from a timing signal generator 22, which signal c is a signal having the same purpose as that of the rectangular signal A described with respect to FIG. 2 and is applied as a gate control signal to the inverter 8 and an AND gate 23. The generator 22 outputs a signal d of high frequency for allowing a counter 25 to actually count to the AND gate 23. Further, the output signal B of the inverter 9 is supplied as a signal e inverted by an inverter 24 to the AND gate 23. Consequently, the AND gate 23 outputs a signal f syncrhonized with the signal d to a clock input terminal CK of the counter 25, thereby allowing the counter 25 to count the signal. The counted value X of the counter 25 is fed to the RAM 13 and the ALU 14. The counted value X becomes, as described above, the value which is proportional in the magnitude to the contacting capacity components Cy of any of the touch electrodes S0 to SF. To the clear input terminal CL of the counter 25 is applied the signal b outputted from the generator 22 when the electrodes S0 to SF are sequentially assigned in a time division manner and completed for the assignment, and the counter is thus cleared by the signal b for next counting operation of the touch electrodes. The output of an AC switch which is connected at one terminal to the high voltage $V_{DD}$ level and at the other terminal to the low voltage $V_{SS}$ through a resistor 26 is fed as an AC signal through a tri-state buffer 27 to the control unit 11. This is provided to store the counted value in the RAM 13 by closing in advance the AC switch in case of inputting a message, outputting the data from the control unit 11 in response to the closed AC switch to scan at least once over the electrodes S0 to SF, thereby obtaining a counted value corresponding to the respective floating capacity components Cx, since the floating capacity components Cx of the electrodes S0 to SF largely vary according to the conditions of the environment.

The operation of the character recognition device thus constructed according to the invention will be concretely described with reference to the flowhcharts in FIGS. 12 to 17. The entire operation will be first generally described with reference to the general flow in FIG. 12. This general flow is started in execution whenever a signal 16 Hz is outputted from the frequency divider 19 in FIG. 7, i.e., at every 1/16 sec. The time counting processing of step $S_1$ is first executed, and the ALU 14 carries out a predetermined computation for the data before the step in the T register of the RAM 13 and computes a present time data. The present time data is then fed to the dot display section 4, which thus displays the present time.

Then, a timer processing of step $S_2$ is carried out. This timer processing is necessary to be processed for a predetermined period in the flow to be described later, and the predetermined period is substracted at every execution of this processing when the predetermined period is preset in the TM register.

Subsequently, the judging processing of "is a message setting mode" of step $S_3$ is executed. This processing judges whether or not the message setting mode is set according to whether or not a mode switch (not shown) for setting the message is turned ON. In case of "YES", the processing is advanced toward the character recognition processing routine, while in case of "NO", the processing is advanced to the judging processing of step $S_4$. This processing judges whether or not it reaches the alarm time present in an AL register. In case of "YES", the processing is advanced to step S$_5$, the message data is read from the RAM and displayed. When the data is displayed for a predetermined period, it is judged by step S$_6$, and the message is then erased from the display by step S$_7$. On the other hand, the case of "NO" in both steps S$_4$ and S$_6$, the general flow is completed, and enters in a ready (HALT) state.

In step S$_8$, judgement is made as to whether or not a flag F$_4$ in FAM 13 is [0] i.e. whether or not the processing is started by an interruption during the execution of the character recognition processing routine. Where there is no interruption during the execution of the character recognition processing routine, and the processing is advanced to step S$_9$, data "1" is set in the flag F$_4$ in the RAM 13, and the execution of the character recognizing in processing is stored in the RAM 13. Then, the recognizing processing of the character pattern inputted as coordinate from the touch electrodes SF to S0 of the input section 4 is executed in accordance with the flow to be described later (in step S$_{10}$), the inputted message data are memorized in the RAM 13 (in step S$_{11}$), the display is confirmed on the dot display section 4 (in step S$_{12}$), and the flag F$_4$ is cleared, thereby removing the character recognizing processing executing state. When the flag F$_4$ is not "0" in step S$_9$, it is judged that there is interruption during the execution of the character recognition processing routine, and the processing is returned to the executing processing before that.

Figure 11:
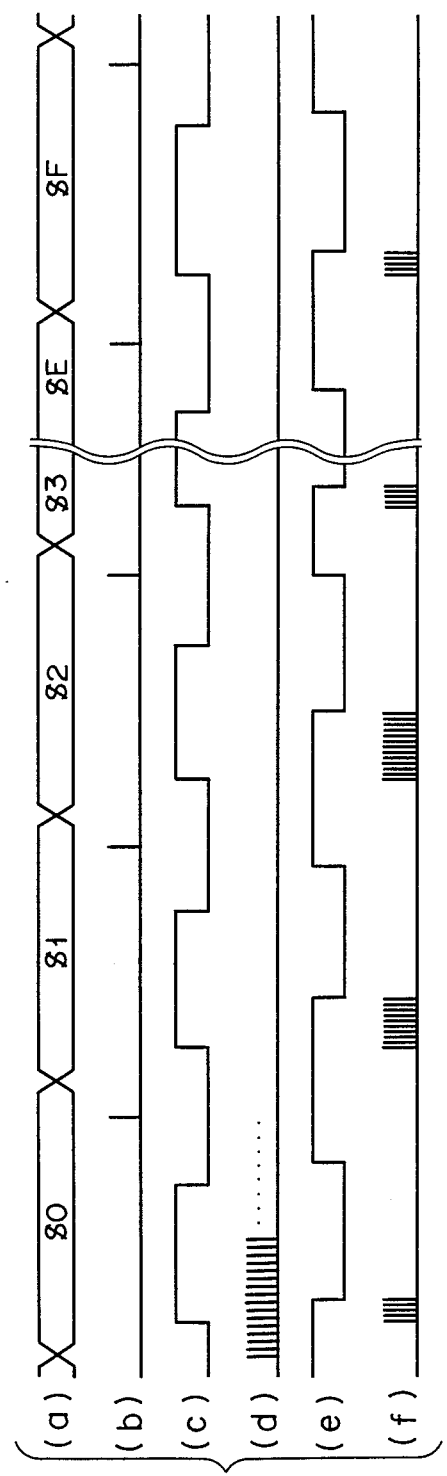
FIGS. 11(a) to 11(f) are timecharts for describing the operation of the input unit 17.
Figure 12:
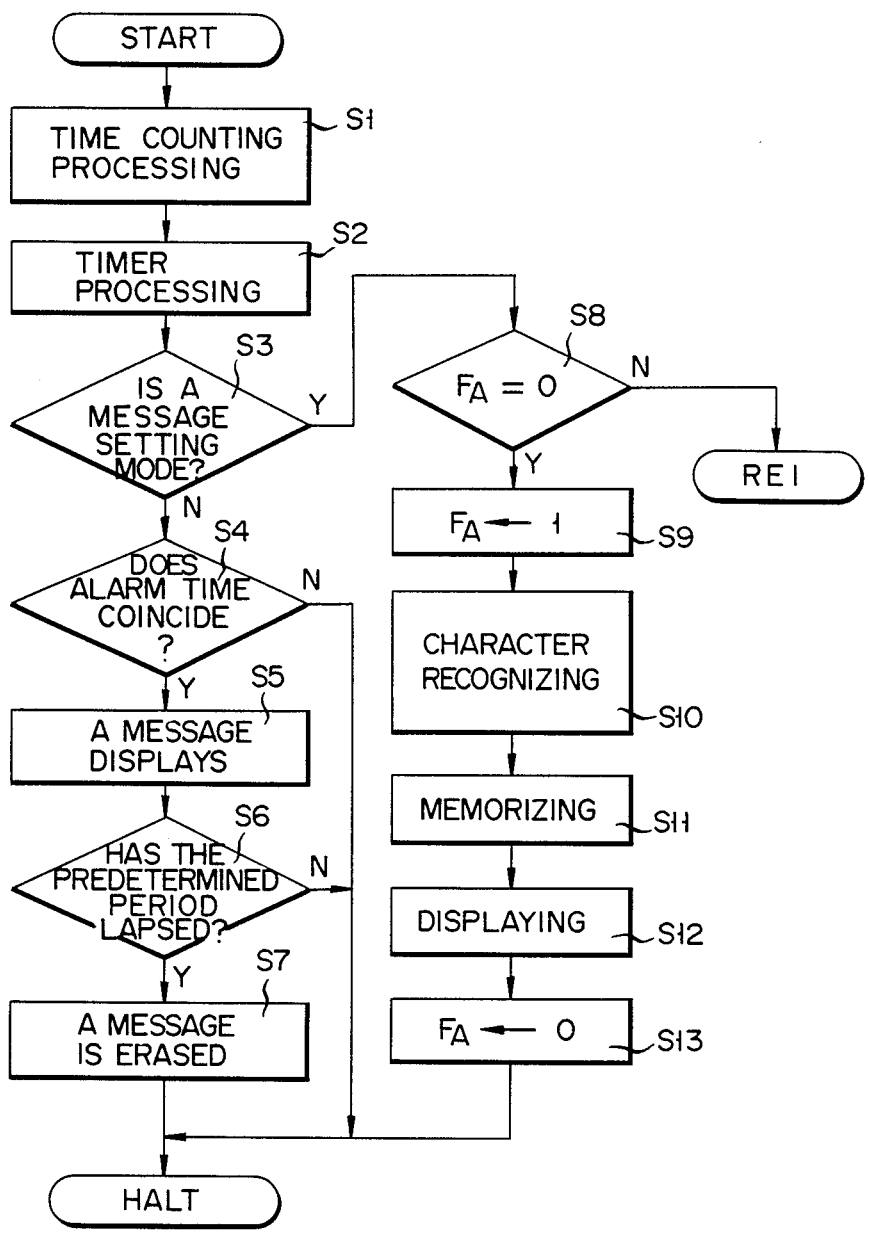
FIG. 12 is a flowchart showing the general flow of the embodiment of the invention.
Figure 13A:
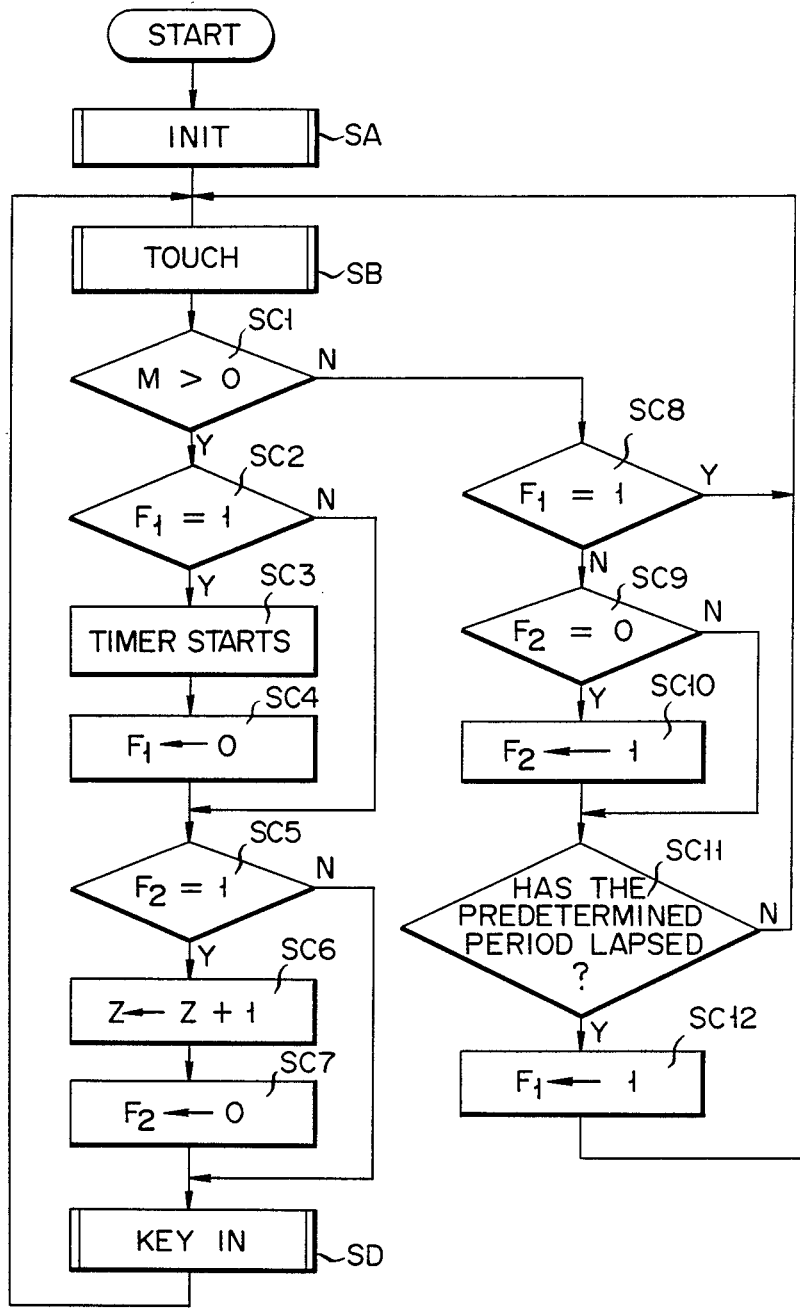
FIGS. 13(a) and 13(b) are flowcharts showing the concrete content of the character recognizing step in FIG. 12.
Figure 13B:
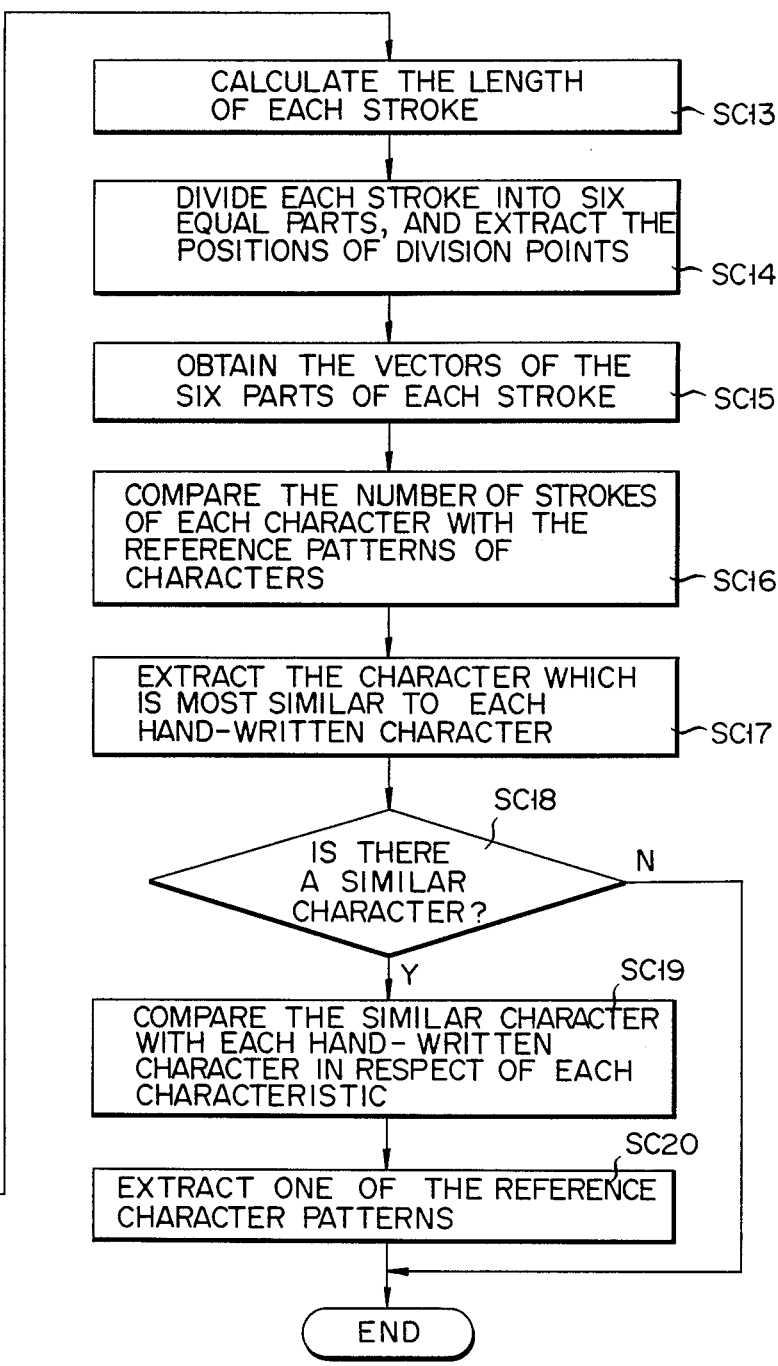
Figure 16:
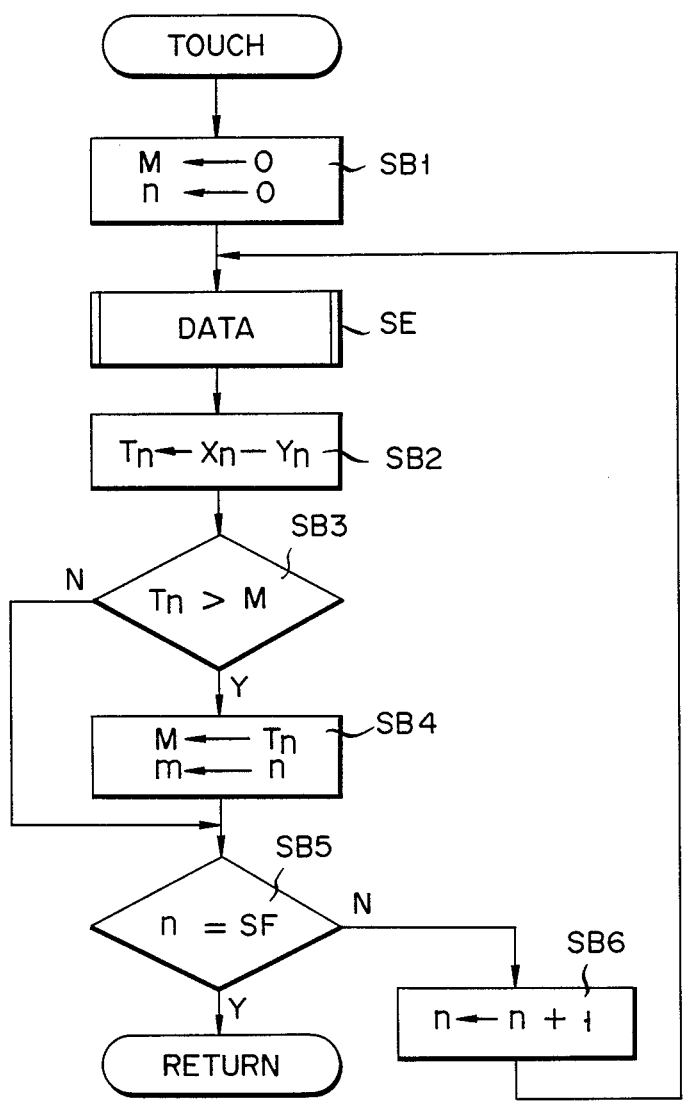
FIG. 16 is a flowchart showing the concrete content of the touching step in FIG. 13(a)
Figure 17:
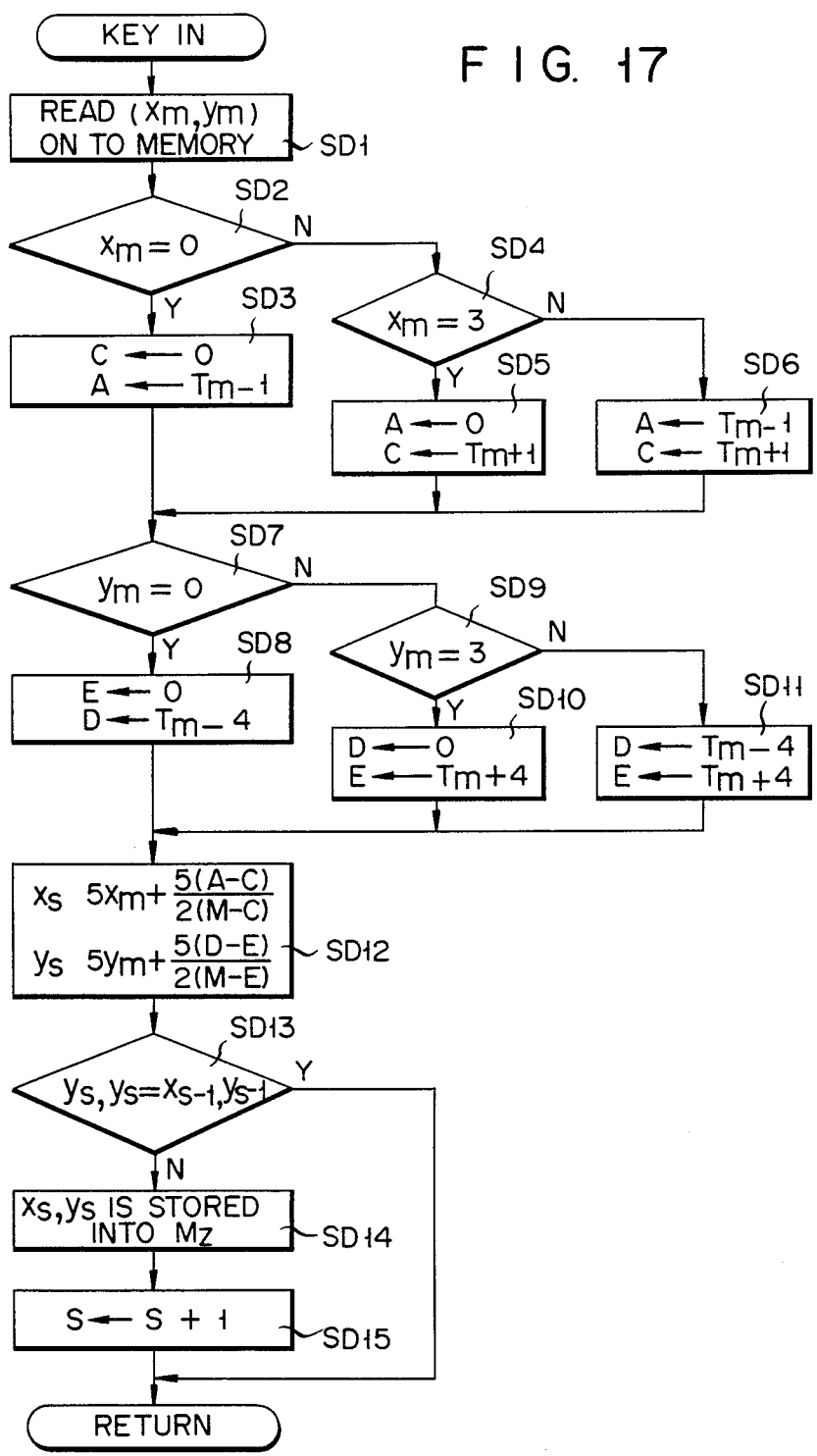
FIG. 17 is a flowchart showing the concrete content of the keying-in step in FIG. 13(a)

FIGS. 13(a) and 13(b) are a flowchart showing the concrete content of the character recognizing processing in step S$_{10}$. More particularly, when the character recognition device enters the character recognizing processing step, the initializing processing of step S$_A$ is first executed. The concrete content of this initializing processing is shown in FIG. 14. Data "1" are set in both flags F$_1$, F$_2$ in the RAM 13 in step S$_{A1}$, and a stroke number counter Z and a counter n in the RAM 13 are cleared. Then, the processing is advanced to step S$_{A2}$, in which "is the AC switch turned On or not" is judged. In case of not ON, the processing is advanced to other processing routines, while in case of ON, the processing enters the data inputting processing of step SE. The content of the data inputting processing has two step processings shown in the flowchart in FIG. 15. In other words, when the AC switch is turned ON, the control unit 11 starts outputting data n, i.e., the data a for sequentially assigning the touch electrodes $0 to $F in a time division manner to the decoder 21 in FIG. 8. Since the data a (data n) is incremented by "1" in this case, the content of the data a (data n) is varied, as shown in the timechart in FIG. 11, in response to the symbols $0 to $F set in the electrodes $0 to $F. After the AC switch is turned ON, the floating capacity component Cx when the human body is not contacted with the electrodes $0, is obtained as the counted value X of the counter 25. More particularly, the signal "1" of high voltage V$_{DD}$ is outputted from the decoder 21 to the transmission gate G$_1$, thereby allowing the gate G$_1$ to be opened. In this manner, a falling signal e is outputted as the output of the electrode $0 from the inverter, in delay from the rise of the rectangular signal C, in response to the magnitude of the floating capacity component Cx of the electrode $0 at that time and inputted to the AND gate 23. Consequently, as shown in FIG. 11, the AND gate 23 is opened while both the rectangular signal C and the signal e are at high voltage V$_{DD}$ level, and a signal f synchronized with the signal d is outputted to the clock input terminal CK of the counter 25, which thus counts the signal as the counted value X (in step SE$_2$). The processing is then advanced to step SA$_3$, wherein the resultant data obtained by adding a predetermined value ξ to the counted value X$_0$ (indicated since the data n is now "0") for the electrode $0 is written in the Yn register (the register in case of n=S0 in FIG. 9) of the RAM 13. This processing is executed to reset the floating capacity component set to ξ=2-3, to a value slightly larger by considering the fluctuation of the floating capacity component Cx and the counting error of the counter 25.

Then, the processing is advanced to step SA$_4$, in which "whether the data n is $F or not", i.e., "whether or not the floating capacity component Cx is detected once for all the electrodes $0 to $F", is judged. Then, the processing is advanced to step SA$_5$, in which data n is added by +1 to become "1", thereby starting detection of the floating capacity component Cx of the electrode $1. Subsequently, the following processing is executed in the same manner as the case of the electrode $0, steps SE, SA$_3$ to SA$_5$ are further repeated 15 times, with the result that, after the AC switch is turned ON, the floating capacity components Cx when the electrodes $0 to $F are not contacted with the human body are respectively memorized in the X$_{$0}$ to X$_{$F}$ registers in the RAM 13, and the corrected values of the floating capacity components Cx added with the predetermined value ξ are respectively memorized in the corresponding Y$_{$0}$ to Y$_{$F}$ registers.

When the initializing processing SA is finished, the processing is advanced to the touch processing of step SB. The detail of the touch processing is shown in the flowchart in FIG. 16. An M register in the RAM 13 is cleared in step SB$_1$, and the counter n is reset. Then, the data inputting processing of the step SE is executed in the same manner, in which case, the counted value X based on the capacity of the floating capacity component Cx, and the contacting capacity component Cy of the respective electrodes $0 to $F when the character pattern of numeric character "2" is inputted as shown in FIG. 18 by contact with the finger of the human body on the X-Y coordinates of the electrodes $0 to $F, is detected. Since the operation of this processing in FIG. 8 is similar to that described above, the description will be omitted, but when the counted value X$_0$ (when n=0) of the electrode $0 is detected, the processing is advanced to step SB$_2$, and the computation of X$_0$-Y$_0$ is executed. More particularly, the counter value Y$_l$ based on the floating capacity component Cx (which is stored as the correcting value in Y$_0$ register, i.e., in Y$_{$0}$ register) is subtrated from the counted value X$_0$ based on the capacity of the floating capacity component Cx and the contacting capacity component Cy, with the result that the subtracted data, i.e., the counted value based only on the contacting capacity component Cy is calculated, and written in the T$_1$ register (designated by TS$_0$ to T$_{$F}$) in FIG. 9.

Then, the processing is executed in step SB$_3$, in which whether or not the data of the T$_0$ register is larger than the data (which is not "0") of the M register or not is executed. If larger, the processing is advanced to step SB$_4$, the data in the T$_0$ register is transferred to and held in the M register, and the data (which is now n=0) of the counter n is transferred to and held in the m register. The processings of the steps SB$_3$, SB$_4$ are to obtain the maximum value of the counted values based only on the contacting capacity component Cy of the electrodes S0 to SF sequentially detected, i.e., to detect the electrode of the maximum contacting capacity component Cy.

Subsequently, the step $SB_5$, whether or not the electrodes S0 to SF are all detected once is judged, the counter n is added by +1, and the detecting of the electrode S1 is started. Thereafter, steps SE, $SB_2$ to $SB_6$ are repeated 15 times, thereby completing the touch processings of all the electrodes S0 to SF. In the meantime, the number of the electrode having the maximum contacting capacity component Cy which is detected as the result of the touch processing, this time by the execution of the steps $SB_3$ and $SB_4$, is memorized in the m register, and the counted value of the maximum contacting capacity component Cy is memorized in the M register.

When the touch processing is thus completed, the processing is advanced to step $SC_1$, and whether or not the data in the M register is larger than "0" is judged. More particularly, this is to judge whether if the human body is already contacted with any of the electrodes S0 to SF. When the character pattern is inputted so that the human body is contacted with any of the electrodes, the data in the M register is larger than "0", and the processing is accordingly advanced to step $SC_2$. In step $SC_2$, whether or not a flag $F_1$ is "1" is judged, and since the flag already becomes "1", the processing is advanced to step $SC_3$, a predetermined time is preset in the TM register, and the timer is started. This is to set the character pattern within the predetermined time set in the TM register. Then, the processing is advanced to step $SC_4$, the flag $F_1$ is cleared. Thereafter, the processing is advanced to step $SC_5$, in which whether or not a flag $F_2$ is "1" is judged, and since the flag is "1", the processing is advanced to step $SC_6$, thereby allowing the stroke number counter Z to become "1", and to become the content indicating the first stroke. Subsequently, the flag $F_2$ is cleared by step $SC_7$, and a key-in processing is started in next step SD. This key-in processing is shown in detail in the flowchart in FIG. 17.

In the key-in processing, the touch electrode (S0 to SF) of the maximum contacting capacity component Cy memorized and held in the m register is converted to the coordinate (xm, ym) by the processing in step $SD_1$. This coordinate is represented by integer values of xm=0, 1, 2 or 3, ym=0, 1, 2 or 3 in the X-Y coordinate system in FIG. 4, and the coordinate of the electrode $S_0$ is, for example, (3, 3). This coordinate (xm, ym) is respectively memorized in the xm and ym registers in the RAM 13.

Subsequently, the processing is advanced to step $SD_2$, in which whether or not the xm is "0", i.e., whether it is any of the electrodes marked with S3, S7, SB and SF at the rightmost end in FIG. 4 is judged. When yes, the correcting processing in case of obtaining the coordinate based on the formula (5) is carried out in the step $SD_3$. In other words, the C register in the RAM 13 is cleared (i.e., the contacting capacity components of the rightward electrodes are "0"), and the data in the registers $TS_1$ to $TS_F$ obtained for the electrodes marked with the symbols S2, S6, SA and SE are transferred to the A register.

In step $SD_2$, when the xm is not "0", the processing is advanced to step $SD_4$, in which whether or not the xm is "3", i.e., if it is any of the electrodes marked with the symbols S0, S4, S8 and SC at the leftmost end in FIG. 4 is judged. When yes, the A register is cleared to correct with the formula (5) (i.e., the contacting capacity component of the leftside electrode is "0"). Further, the data in the $TS_1$ to $TS_F$ registers obtained for the electrodes marked with the symbols S1, S5, S9 and SD are transferred to the C register.

Further, when xm data is not "3", the electrodes having the maximum contacting capacity component Cy detected this time are any of the electrodes marked with the symbols S1, S5, S9, SD, S2, S6, SA and SE. In this case, the contacting capacity component of the leftward touch electrode having a number one less than the number of the touch electrode of the maximum component Cy is transferred to the A register, and the contacting capacity component of the rightward touch electrode having a number one more than the number of the touch electrode of the maximum component Cy is transferred to the C register.

The foregoing description relates to the processing of correcting in the X-axis direction, in the case of obtaining the central coordinate of the present contacting area by the formula (5). However, the processing of the steps of next steps SD7 to SD11 is to correct the data in the Y-axis direction. Since steps SD7, SD8, SD9, SD10 and SD11 evidently correspond to the steps SD2, SD3, SD4, SD5 and SD6, the description will be omitted.

When the above-described resepective processings are completed, the computation of the formula (5) in step SD12 is carried out, the central coordinate (xs, xy) of the present contacting area is obtained, and temporarily memorized in xs and ys registers in the RAM 13. In this case, since the data of the maximum contacting capacity component is stored in the M register, data M is described instead of the data B in the step SD12. Further, the data S takes values of 0 to 19 (Refer to the RAM 13 in FIG. 10).

When the central coordinate (xs, ys) is obtained in this manner, the processing is advanced to next step SD13, in which whether or not the coordinate (xs, ys) of this time coincides with the coordinate (xs−1, ys−1) of the previous time, i.e., if the finger is retained at one position to vary the central coordinate, is judged. When varied, the processing is advanced to step SD14, the coordinate (xs, ys) is memorized in the S address of the area M1 of the first stroke of the RAM 13 in FIG. 10. Then, the S register in the RAM 13 is added by +1, it becomes "1". On the other hand, when the fact that the central coordinate is not varied is judged in the step SD13, the processing is immediately returned to the touch processing of the step SB.

As described above, the first central coordinate of the first stroke of the inputted character pattern is obtained, the steps SB, SC1 to SC7, SD are repeated until the finger is isolated from the electrodes S0 to SF. In the meanwhile, the data S is varied 1 by 1, from 0 to 19, and up to 20 central coordinates (xs, ys) at maximum are written in the 0 to 19 addresses of the area M1. For the second, third and fourth strokes of the characters of second stroke (e.g., "4"), third stroke (e.g., "F") and fourth stroke (e.g., "E"), the characters are written at the maximum of 20 central coordinates (xs, ys) in the 0 to 20 addresses of the areas M2, M3 and M4 in the RAM 13 in the same manner as the case that the characters are inputted to the TM register within the timer time set in the TM register.

On the other hand, the touch processing of the step SB is executed after the initializing processing of the step SA is carried out. However, when the fact that M>0 is discriminated because the human body is not contacted with the electrodes S0 to SF in the next step SC1, the processing is advanced to step SC8, and whether the flag F1 is "1" is judged. Then, since it is already set to "1" in the initializing processing, it is returned to the touch processing of the step SB. Then, the steps SB, SC1, SC8, SB, ... are repeated until the human body is contacted with the electrodes.

If the flag F1 is not "1" in the step SC8 i.e. first stroke is entered, the processing is advanced to step SC9, and whether or not the flag F1 is "0" is judged. When not "0", the processing is jumped to SC11, while when "0", the flag F2 is set to "1" by the step SC10, and the processing is advanced to SC11. In step SC11, whether or not the timer period is elapsed is judged. When not elapsed, the processing is returned to the step SB, while when elapsed, the processing is advanced to step SC12.

When the processing is advanced to the step SC12 after the character pattern is inputted within the timer period, the flag F1 is set to "1" in the step SC12. Then, the processing is advanced to step SC13. If it is assumed, for example, all inputs for the numeric character "2" of a single or first stroke as shown in FIGS. 18(a) to 18(c), the central coordinate (xs, ys) of one stroke should be already memorized in the area M1 of the RAM 13 at the maximum of 20. Therefore, in step SC13, each central coordinate (xs, ys) is extracted, and the length of the first stroke, i.e., the length of each stroke is calculated.. In step SC14, the calculated stroke length is divided into six equal parts as shown in FIG. 18(b), and the positions of division points of the coordinate is extracted. Next, in step SC15, the start point and first division point, the division point and next division point, and the last division point and ending point are connected as shown in FIG. 18(c), and the vectors of the six parts of each stroke are obtained in accordance with the vector diagram in FIG. 19, thereby obtaining the vectors. The vector row obtained in the example in FIG. 18(c) is "175570".

Then, in step SC16, the vector row is compared with the reference vector row in the ROM 12. In this case, since a character of a first or single stroke is contained, the directional differnece of the respective components is obtained for the reference vectors of the respective characters in FIG. 20 due to the nature of the single stroke, and the sum of the directional differences is then obtained. In other words, when the components of the reference vector row are designated by "a1 a2 a3 a4 a5 a6" and the components of the detected vector row are by "b1 b2 b3 b4 b5 b6", the difference (a1−b1), (a2−b2), ... , (ab−b6) of the respective components are first obtained. Consequently, the values of −7 to +7 are obtained, but in case of −4 to +4, the absolute values are used as directional difference, in case of −7 to −5, the values converted to 1 to 3 are used, and in case of +5 to +7, the value converted to 3 to 1 are used as directional difference, and the sum of these six directional differences is obtained.

Figures 22, 23, 24:
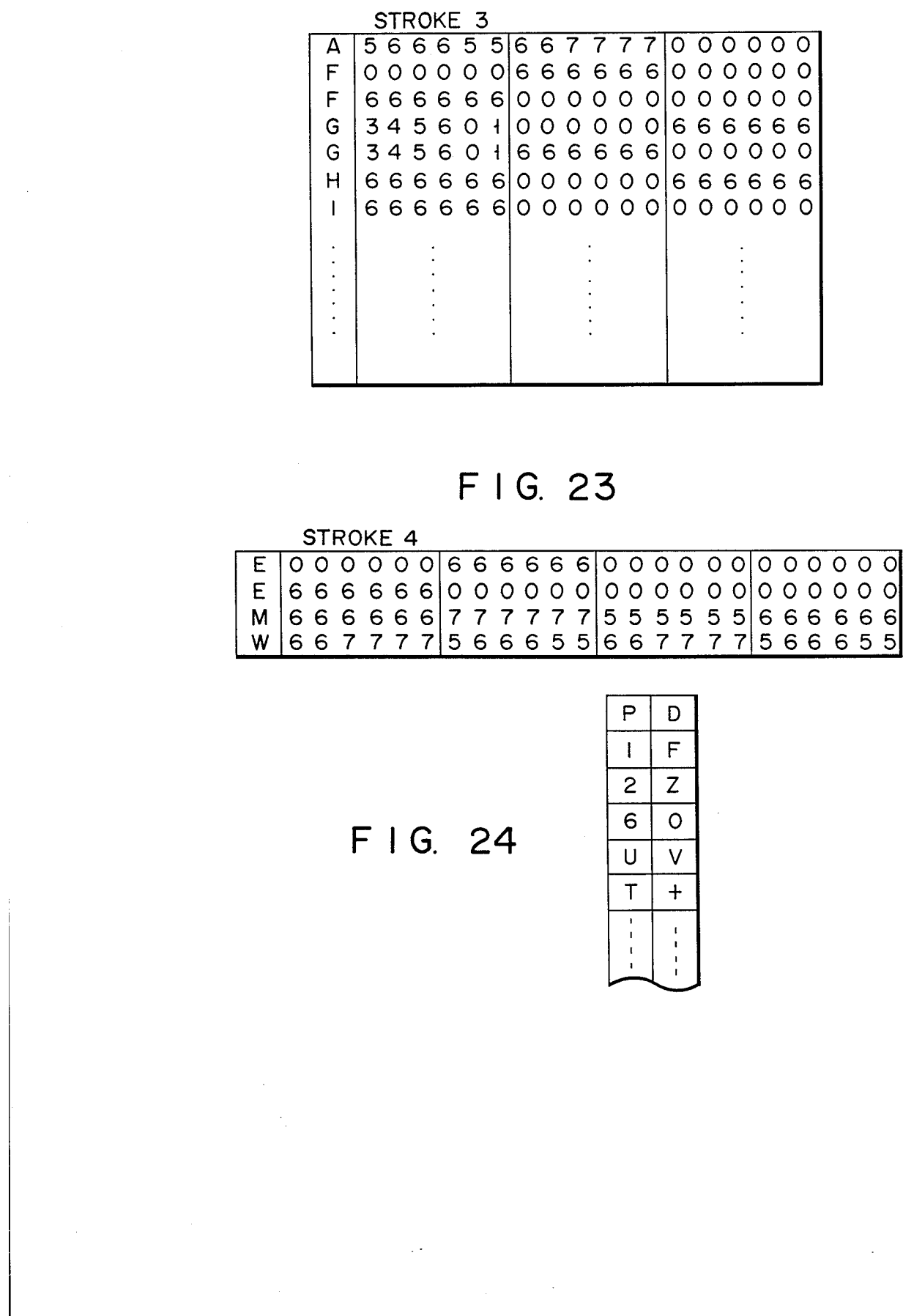

For instance, in case of the reference vector row "467012" of the character "0" of the reference vectors in FIG. 20 as an example, 4−1=3, 6−7=1, 7−5=2, 0−5=−5, 1−7=−6, 2−0=2 are calculated, directional differences 3, 1, 2, 3, 2, 2 are then obtained, and the sum of the directional differences is obtained by 3+1+2+3+2+2=13 from the vector row "175570". For the other characters "0", "1", "2", ... , similar calculation can be carried out. IN step SC17, the sum which is the minimum of the sums of the directional differences thus obtained as described above is extracted, and the character which is most similar to each hand-written character is outputted. Then, in step SC18, whether or not a plurality of characters are outputted as the similar character, is judged. When a plurality of characters are outputted, the processing is further advanced to step SC19, the detailed characteristic of the input character is compared and confirmed. In this case, the example that the input character is judged as being similar with each hand-written character in respect of each characteristic is, as shown in FIG. 24, between the characters "P" and "D", between the characters "I" and "F", ... In case of between the characters "P" and "D", the magnitudes of the distance between the ending points of the first and second strokes are compared between the characters "P" and "D", thereby judging the difference. Consequently, one character of a plurality of similar characters is extracted (in step SC20), displayed as the input character pattern on the dot display section 4, and memorized as the message data in the RAM 13.

On the other hand, when the character having the minimum sum of the differences is only one, the character is immediately judged as the input character. In the processings in SC13 to SC17, it is natural that, in case that the number of strokes of the entirety are second, third and fourth, the second, third and fourth strokes of the characters are processed in the same manner as the first stroke of the character.

In the embodiments described above, 16 touch electrodes arranged along the X-Y coordinate system in a matrix of 4×4 were employed. However, the number of the touch electrodes is not limited only to sixteen. In the embodiments described above, the X-Y coordinate system employed 256 points arranged in a matrix of 16×16. However, the scale of the X-Y coordinate system is not limited to the above-described embodiment. In the embodiments described above, the number of strokes of the inputted character is up to 4 with numeric and alphabetic characters. However, the number of strokes can be arbitrary, and the types of the character may be any of katakana characters, hiragana characters, kanji characters and as symbols or figures. Further, in the embodiments described above, each stroke was divided into six equal parts. However, the division number may be be limited to 6.

What is claimed is:

1. A method of recognizing a character finger-traced on a plurality of touch responsive electrodes, comprising:

detecting values of touch capacitances of at least two of said touch responsive electrodes which are touched simultaneously by a person's finger;

a first step of storing the value of each touch capacitance detected in said detecting step;

calculating central contacting point data based on said stored values of the touch capacitances of at least two of said touch responsive electrodes, for thereby obtaining any one of at least three different central contacting point data between at least two of said touch responsive electrodes in addition to actuation of individual electrodes the touch capacitances of which were stored in said first storing step;

a second step of storing the central contacting point data obtained in said calculating step;

repeating said detecting step, said first storing step, said calculating step and said second storing step while said person's finger is tracing on said plurality of touch responsive electrodes, thereby obtaining plural items of central contacting point data which are greater in number than those of said touch responsive electrodes which are finger-traced; and recognizing a finger-traced character based on said plural items of central contacting point data obtained by said repeating step.

2. The method of claim 1, wherein said character recognizing step includes the steps of:

obtaining vector rows of said finger-traced character from said plural items of central contacting point data;

comparing said obtained vector rows with reference vector rows of a plurality of characters, which are pre-stored; and producing character data corresponding to those vector rows which are detected to coincide with said reference vector rows in said comparing step.

3. The method of claim 2, wherein said vector-row obtaining step includes the steps of:

obtaining length data of each stroke of said finger-traced character based on said plural items of central contacting point data;

dividing said length data equally into sub-length data; and obtaining vector rows of said sub-length data.

4. The method of claim 1, wherein said central contacting point data calculating step includes the step of obtaining central contacting point data, using the largest contacted touch capacitance component among said contacted touch capacitance components of at least two touch responsive electrodes, which have been stored in said touch-capacitance component detecting step, and a contacted capacitance component of that touch responsive electrode which is adjacent to the touch responsive electrode having said largest contacted capacitance component.

5. The method of claim 1, including arranging said plurality of touch responsive electrodes in a matrix form.

6. The method of claim 1, further comprising the steps of:

storing character data representing said character recognized in said character recognizing step;

counting reference signals to obtain time data;

storing alarm time data in an alarm time memory; and displaying said stored character data when said time data obtained in said counting step accords with the alarm time data stored in the alarm time memory.

* * * * *

UNITED STATES PATENT AND TRADEMARK OFFICE
CERTIFICATE OF CORRECTION

PATENT NO. : 4,771,268
DATED      : September 13, 1988
INVENTOR(S): Sone et al

It is certified that error appears in the above-identified patent and that said Letters Patent is hereby corrected as shown below:

On the title page Item (54), change title to read

-- METHOD FOR RECOGNIZING FINGER-TRACED CHARACTERS --.

Signed and Sealed this

Fifteenth Day of August, 1989

*Attest:*

DONALD J. QUIGG

*Attesting Officer*     *Commissioner of Patents and Trademarks*